United States Patent
Kim et al.

(10) Patent No.: US 9,622,147 B2
(45) Date of Patent: Apr. 11, 2017

(54) SYSTEM AND METHOD FOR PERFORMING HYBRID AUTOMATIC REPEAT REQUEST (HARQ) IN A WLAN SYSTEM

(71) Applicant: APPLE INC., Cupertino, CA (US)

(72) Inventors: Joonsuk Kim, Cupertino, CA (US); Yuchul Kim, Santa Clara, CA (US); Syed A. Mujtaba, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/483,855

(22) Filed: Sep. 11, 2014

(65) Prior Publication Data

US 2015/0071276 A1 Mar. 12, 2015

Related U.S. Application Data

(60) Provisional application No. 61/877,085, filed on Sep. 12, 2013.

(51) Int. Cl.
| | |
|---|---|
| *H04W 40/22* | (2009.01) |
| *H04L 1/18* | (2006.01) |
| *H04L 12/721* | (2013.01) |
| *H04W 24/08* | (2009.01) |

(Continued)

(52) U.S. Cl.
CPC ............. *H04W 40/22* (2013.01); *H04L 1/189* (2013.01); *H04L 1/1845* (2013.01); *H04L 1/1864* (2013.01); *H04L 45/70* (2013.01); *H04W 24/08* (2013.01); *H04L 1/0061* (2013.01); *H04W 84/12* (2013.01)

(58) Field of Classification Search
CPC ...... H04L 1/1845; H04L 1/1864; H04L 1/189; H04L 45/70; H04L 1/0061; H04L 1/1812–1/1819; H04W 24/08; H04W 40/22; H04W 84/12; H03M 13/6306
USPC .................................. 370/338; 714/748–751
See application file for complete search history.

(56) References Cited

U.S. PATENT DOCUMENTS

| | | |
|---|---|---|
| 2003/0112780 A1 | 6/2003 | Ouyang et al. |
| 2005/0226159 A1* | 10/2005 | Terry .................... H04L 1/1819 370/236 |

(Continued)

FOREIGN PATENT DOCUMENTS

| | | |
|---|---|---|
| EP | 2 077 646 | 7/2009 |
| TW | 200952381 | 12/2009 |

(Continued)

*Primary Examiner* — Mark Rinehart
*Assistant Examiner* — Kenneth P Hunt
(74) *Attorney, Agent, or Firm* — Fay Kaplun & Marcin, LLP

(57) ABSTRACT

A method and device for decoding packets received via a wireless local area network. The method performed by the device including receiving a packet, the packet including a signal portion and a data portion, verifying the signal portion of the packet is valid, determining if the packet is destined for the device, determining if the packet is a retransmission, combining, when the packet is a retransmission, information from the data portion of the packet with stored information from a previously received packet having a data portion that was not successfully decoded and attempting to decode the packet based at least in part on the information and stored information.

20 Claims, 5 Drawing Sheets

(51) Int. Cl.
 *H04W 84/12* (2009.01)
 *H04L 1/00* (2006.01)

(56) References Cited

U.S. PATENT DOCUMENTS

| | | | | |
|---|---|---|---|---|
| 2007/0079207 A1* | 4/2007 | Seidel | ............... | H04L 1/1845 |
| | | | | 714/748 |
| 2007/0147381 A1* | 6/2007 | Wilhelm | ............... | H04L 1/08 |
| | | | | 370/392 |
| 2009/0031185 A1* | 1/2009 | Xhafa | ............... | H04L 1/0013 |
| | | | | 714/751 |
| 2009/0219851 A1* | 9/2009 | Abraham | ............ | H04L 1/1812 |
| | | | | 370/315 |
| 2014/0126580 A1* | 5/2014 | Sampath | ............ | H04L 1/1819 |
| | | | | 370/428 |
| 2014/0293868 A1* | 10/2014 | Levanen | ............ | H04L 1/1607 |
| | | | | 370/328 |

FOREIGN PATENT DOCUMENTS

| | | |
|---|---|---|
| WO | 2005/109730 | 11/2005 |
| WO | 2008/021286 | 2/2008 |
| WO | 2009/137464 | 11/2009 |

* cited by examiner

SYSTEM AND METHOD FOR PERFORMING HYBRID AUTOMATIC REPEAT REQUEST (HARQ) IN A WLAN SYSTEM

PRIORITY CLAIM/INCORPORATION BY REFERENCE

This application claims priority to U.S. Provisional Application 61/877,085 entitled "System and Method for Performing Hybrid Automatic Repeat Request (HARQ) in a WLAN System," filed on Sep. 12, 2013, the entirety of which is incorporated herein by reference.

BACKGROUND INFORMATION

Hybrid Automatic Repeat Request (HARQ) is an approach to communicating data that includes the use of data retransmissions and forward error correction. A number of communication systems (such as UMTS and LTE) include the use of HARQ. However, HARQ is not employed in many wireless local area network (WLAN) systems because a device needs to know that the packet is destined for the device to perform HARQ processing and decoding. In these WLAN systems, a device cannot know the payload is destined for the device until the payload is decoded because the destination information is included in the payload. Once the packet is decoded, there is no need to perform HARQ processing; thus, HARQ processing is not performed such systems.

DETAILED DESCRIPTION

Figure 1:
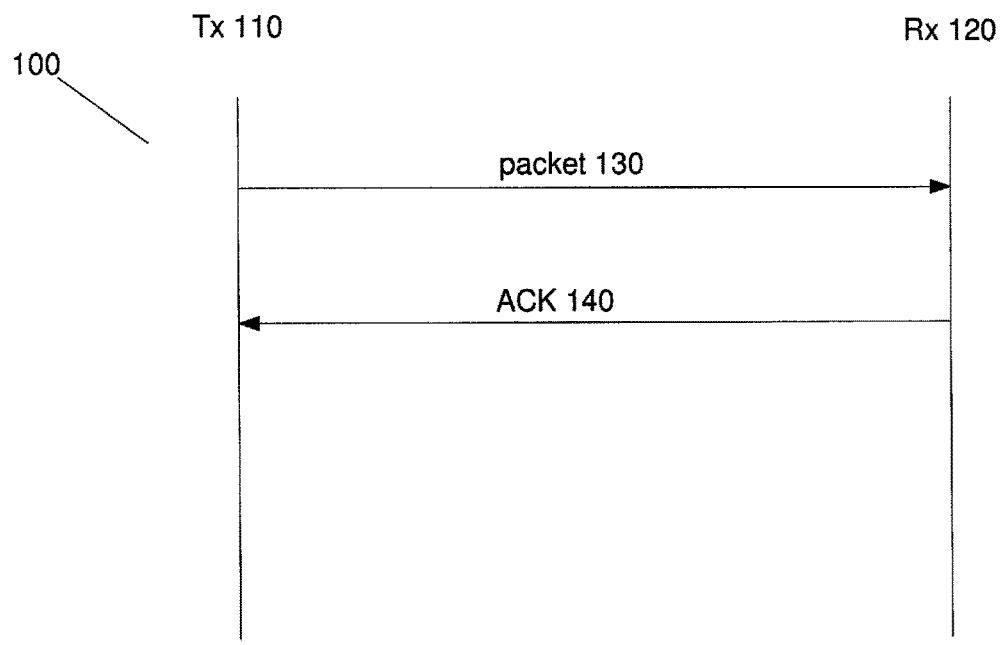
FIG. 1 shows a typical successful transmission of a packet in a WLAN.

The exemplary embodiments may be further understood with reference to the following description and the related appended drawings, wherein like elements are provided with the same reference numerals. The exemplary embodiments are related to the performance of Hybrid Automatic Repeat Request (HARQ) processing in a WLAN system. As used herein, the term "WLAN" includes (but is not limited to) wireless technology as defined according to IEEE 802.11/a/b/g/n/ac/ah, IEEE 802.11-2012, and/or other IEEE 802.11 standards. Throughout this description the term "packet" will be used to describe the information that is transmitted from a transmitting device to a receiving device. The term "packet" may include any information in any format. Examples of a packet may include a data packet, a control packet, a management packet, etc.

FIG. 1 shows a typical successful transmission of a packet in a WLAN 100. The WLAN system includes a transmitting device (Tx) 110 and a receiving device (Rx) 120. Throughout this description the transmitting and receiving devices may be any devices that are capable of transmitting and/or receiving packets over the WLAN network 100. In FIG. 1, the Tx 110 transmits a packet 130 to the Rx 120. Upon receipt of the packet 130, the Rx 120 attempts to decode the packet 130. If the Rx 120 is successful in decoding the packet 130, the Rx 120 sends an acknowledgement (ACK) 140 to the Tx 110 indicating that the transmission was successful. The success of the decoding is generally based on a checking of the packet against internal information stored in the packet. One example of a check is a cyclic redundancy check (CRC). If the CRC is successful, then the Rx 120 knows that the packet has been successfully decoded. The exemplary embodiments describe the checks on the packet as CRC checks, but the exemplary embodiments are not limited to these types of checks and may include other types of data checking to verify the packet is correct.

Figure 2:
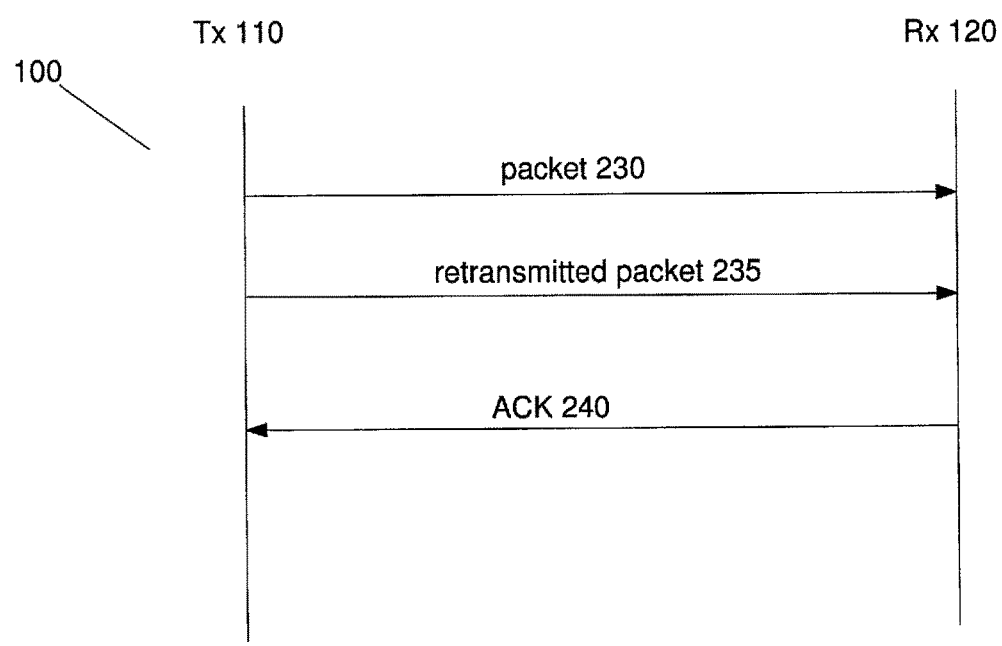
FIG. 2 shows a typical first unsuccessful transmission of a packet between two nodes in a WLAN.

FIG. 2 shows a typical first unsuccessful transmission of a packet in a WLAN 100. FIG. 2 shows the same WLAN network 100 and Tx 110 and Rx 120 as FIG. 1. In this example, the Tx 110 sends a packet 230 to Rx 120. However, in this case it is considered that the Rx 120 is unsuccessful at decoding the packet 230. Those skilled in the art will understand that there are numerous reasons (e.g., channel interference, strength of signal, noise, etc.) that the Rx 120 may be unsuccessful in decoding the packet 230. In this case, the Rx 120 will not send an ACK back to the Tx 110 because the decoding was not successful. Typically, if the Tx 110 does not receive an ACK after a predetermined time period, the Tx 110 will retransmit the same packet (labeled as retransmitted packet 235 in FIG. 2) to the Rx 120 as shown in FIG. 2. The Rx 120 will attempt to decode the retransmitted packet 235 and, if successful, will transmit an ACK 240 to the Tx 110. Those skilled in the art will understand that the Tx 110 may retransmit the packet multiple times to the Rx 120 until the Tx 110 receives an ACK indicating that the packet has been successfully received by the Rx 120 or until a timeout period or a set number of retransmissions without an ACK are reached. In some systems, the RX 120 may send a negative acknowledgment (NACK) to the TX 110 when the decoding is not successful to indicate the TX 110 should retransmit the packet.

The exemplary HARQ processing is employed in the situation of one or more unsuccessful transmissions such as that shown in FIG. 2. The point of HARQ processing is to use information that can be extracted from previous unsuccessful packet transmissions to aid in the decoding of a currently retransmitted packet. In the example of FIG. 2, while the initial packet 230 may not have been successfully decoded, the Rx 120 may have extracted certain information from the packet 230 that can be used to decode subsequent packets such as retransmitted packet 235. The Rx 120 will store this extracted information from the packet 230 to use when decoding retransmitted packet 235. In the exemplary embodiments described herein, the information that is stored by the Rx 120 for unsuccessful decodes will be described as Log-Likelihood Ratio (LLR) data which is used in the HARQ processing. However, those skilled in the art will understand there are different types of HARQ processing and that the appropriate data for the selected type of HARQ processing may be stored by the Rx 120. Some examples of different types of HARQ processing include Incremental Redundancy (IR) HARQ processing and Chase Combining (CC) HARQ processing.

Figure 3:
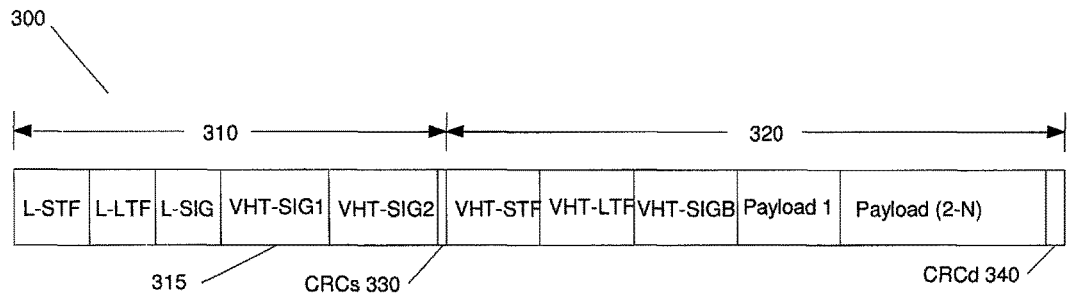
FIG. 3 shows a typical WLAN packet structure.

FIG. 3 shows a typical WLAN packet structure 300. The packet structure 300 is based on the IEEE 802.11 ac standard. Those skilled in the art will understand that the exemplary embodiments are not limited to this exemplary packet structure, but this packet structure 300 is merely shown as an example of a packet structure with which the exemplary embodiments may be implemented. The packet structure 300 may be generally considered to have two general portions, a signal portion 310 and a data portion 320. It is not a requirement that there be an exact delineation between the information that is included in the signal portion 310 and the data portion 320. In this example, the delineation is based on the fact that there is first CRC information labeled CRCs 330 for checking the signal portion 310 and second CRC information labeled CRCd 340 for checking the data portion 320.

In typical WLAN packet structures, the MAC address identifying the recipient device is located in the data portion 320. To perform HARQ processing, the device that receives the packet should be sure that the packet is destined for the device. Thus, the device will only know that the packet is destined for the device after it successfully decodes the data portion of the device. After a successful decoding of the packet, HARQ processing is irrelevant because HARQ processing aids in the decoding process. In the exemplary packet structure 300, the MAC address of the recipient is included in the data portion 320, however the MAC address or a proxy for the MAC address may also be included in the signal portion 310. In the example of the packet structure 300 of the IEEE 802.11ac standard, the VHT-SIG field 315 includes Partial Associated Identifier (PAID) bits that may be used to include the recipient MAC address or a partial identification of the recipient MAC address in the signal portion 310. The reason for including the MAC address (or a proxy) in the signal portion will be described in further detail below.

The following provides a discussion of the transmissions described with reference to FIGS. 1 and 2 using the packet structure 300 and the potential use of HARQ processing based on the transmissions according to the exemplary embodiments. For example, if the packet 130 of FIG. 1 was transmitted in the format of packet structure 300, and the Rx 120 successfully performed both the check on the CRCs 330 and CRCd 340, then the decode is considered successful and the ACK 140 is sent by the Rx 120. If the packet 230 of FIG. 2 was transmitted in the format of packet structure 300, and the Rx 120 was unsuccessful in performing either or both of the check on the CRCs 330 and CRCd 340, then the decode is unsuccessful and no ACK is sent to the Tx 110, resulting in the retransmitted packet 235 being sent to the Rx 120. With the unsuccessful decoding of packet 230, there are two relevant scenarios. In the first scenario, both the check on the CRCs 330 and the CRCd 340 are unsuccessful. In such a case, the HARQ processing in a WLAN device is not implemented. In a second scenario, the CRCs 330 check is successful, but the CRCd 340 check is unsuccessful. In this scenario, the HARQ processing in the WLAN device may be implemented as described below.

As described above, since the packet structure 300 includes the recipient MAC address (or proxy) in the signal portion 310, the receiving device (e.g., Rx 120) may determine whether the packet 230 is intended for the Rx 120 even though the complete decoding of the packet 230 was unsuccessful (e.g., data portion 320 was not successfully decoded because the CRCd 340 check was not successful). If the Rx 120 determines that the packet 230 is destined for the Rx 120, the Rx 120 may invoke HARQ processing to aid in the decoding of the retransmitted packet 235. Thus, as can be seen from the above discussion, HARQ processing may be invoked in a WLAN system when the packet 230 is unsuccessfully decoded, but the receiving device (e.g., Rx 120) determines through a partially successful decoding that the packet is destined for the receiving device.

The Rx 120 may use one additional piece of information that is included in the signal portion 310 for invoking HARQ processing. This additional piece of information may be whether the received transmission is an original transmission (e.g., packet 230) or a retransmission (e.g., retransmitted packet 235). The purpose of this information for invoking HARQ processing will be described in greater detail below. In most WLAN packet structures (e.g. packet structure 300) there are reserved bits that may be used to signal additional information to the Rx 120. There may be any number of manners of signaling the Rx 120 that the packet is an original packet or a retransmitted packet. Some examples of the signaling are provided below.

In one example, the packet structure 300 may include a new packet indicator (NPI) bit in the signal portion 310 that is set to a value each time a new packet is transmitted. A new packet is considered a packet that is not a retransmitted packet. For example, the packet 230 would be considered a new packet and would have an NPI bit that is set by the Tx 110 to a first value (e.g., 1). That is, when formatting the packet structure 300 for the packet 230, the Tx 110 sets the NPI bit in the signal portion 310 to the first value that is different from the NPI bit of the previously transmitted packet to indicate the packet 230 is an original transmission. Upon receipt of the packet 230, the Rx 120 decodes the NPI bit and determines if the packet 230 is an original transmission or a retransmission. This is accomplished by determining whether the NPI bit for the packet 230 is the same or different from the NPI bit of the immediately preceding packet. If the NPI bit is the same as the previous transmission, then the transmission is a retransmission. If the NPI bit is different from the previous transmission, then the transmission is an original transmission. To carry through with the example started above, it may be assumed that the Rx 120 determines that the packet 230 has a different NPI bit value than the previously received packet indicating that the packet 230 is an original transmission.

In contrast, when the Tx 110 prepares the retransmitted packet 235 for transmission, the Tx 110 sets the NPI bit in the signal portion 310 to the same first value as the packet 230 to indicate the retransmitted packet 235 is a retransmission. Upon receipt of the retransmitted packet 235, the Rx 120 decodes the NPI bit and determines that the retransmitted packet 235 is a retransmission because it includes the same NPI bit value as the previously transmitted packet 230. If there are additional retransmits of the packet 230 after the retransmitted packet 235, these additional retransmits would also include the same NPI bit value as the packet 230 to indicate that these packets are retransmissions.

In another example, the packet structure 300 may include an initial transmission indicator (ITI) bit in the signal portion 310 that is set to a value of 0 for original transmissions (e.g., packet 230) and 1 for retransmissions (e.g., retransmitted packet 235). Thus, when Rx 120 receives a packet and decodes the signal portion 310 that includes the ITI bit, the Rx 120 may determine if the packet is an original transmission or a retransmission based on the ITI bit value.

Figure 4:
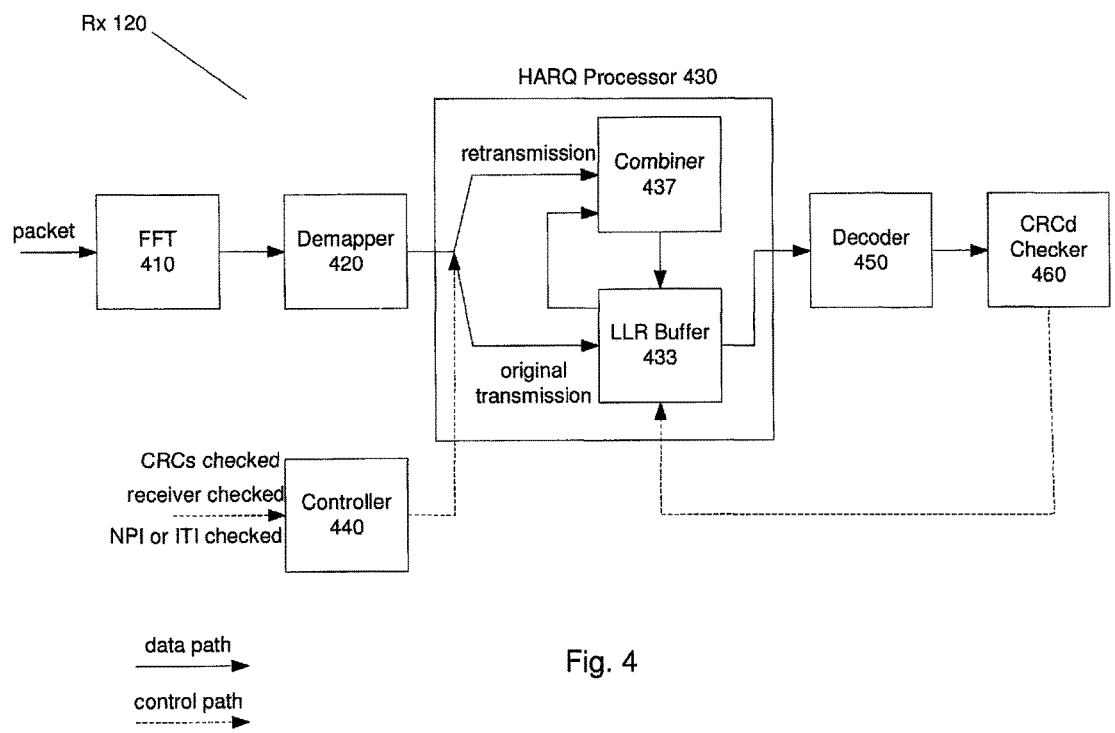
FIG. 4 is an exemplary block diagram of an exemplary receiving device.

FIG. 4 shows a packet being received by the Rx 120 that processes the received signal through a Fast Fourier Transform (FFT) component 410, the output of which is then processed through a demapper component 420. This output is then processed through the HARQ processor 430. As can be seen in the block diagram, the path of the processed packet depends on whether the packet is an original transmission or a retransmission. A controller 440 determines the path through the HARQ processor 430 based on a determination of whether the packet is an original transmission or a retransmission. As described above, the controller 440 may determine whether the packet is an original transmission or a retransmission based on a bit (e.g., NPI bit or ITI bit) that is in the signal portion of the packet. It should be noted that it is assumed that the Rx 120 successfully performs the CRCs 330 check on the packet to determine the type of transmission (e.g., original transmission or retransmission) and that the packet is destined for the Rx 120. If the CRCs 330 check is not successful, the packet is discarded because neither of these determinations can be made without the use of the data from the signal portion of the packet.

If the packet is an original transmission (e.g., packet 230), the packet is sent to a Log-Likelihood Ratio (LLR) buffer 433. As described above, LLR is information that is used in a particular type of HARQ processing. The LLR information may be described as the logarithm of the ratio of likelihoods (or probability) that a particular bit in the data portion of the packet has a certain value (e.g., any positive (or negative) real value indicate original information is +1 (or −1). The larger the magnitude of the LLR, the more likely it is.). The LLR buffer 433 stores the LLR information for the received data portion 320. If the data portion 320 cannot be decoded, this stored LLR information will be used for the HARQ processing of any retransmissions as will be described in detail below. It should be noted that while the LLR buffer 433 is shown as a component within the HARQ processor 430, those skilled in the art will understand that this may be a logical construct and the LLR buffer 433 may be a memory component that is separate from the HARQ processor 430.

Continuing with the example that the packet is an original transmission (e.g., packet 230), the packet with the LLR information is sent to the decoder component 450 that attempts to decode the data portion 320 of the packet using, at least in part, the LLR information from the packet. The decoded data portion 320 is sent to the CRCd component 460 where the CRCd 340 check is performed. If the CRCd 340 check is successful, the decoded bits are output and the LLR buffer 433 is flushed because the packet has been successfully decoded and the LLR information for this packet is no longer needed. The successful decoding also results in the Rx 120 generating an ACK for the packet and sending the ACK to the Tx 110 to indicate the successful receipt and decoding of the packet. However, if the CRCd 340 check is not successful, the LLR information for the packet will remain in the LLR buffer 433 and the Rx 120 will not generate an ACK, resulting in the TX 110 sending a retransmitted packet.

Thus, in the example of an unsuccessfully decoded packet, the next packet that is received by the Rx 120 will be a retransmitted packet (e.g., retransmitted packet 235)). The controller 440 will determine the packet is a retransmitted packet (e.g., based on the NPI or ITI bits in the signal portion) and will direct the packet to the combiner component 437 of the HARQ processor 430. In the combiner component 437, the LLR of the retransmitted packet will be combined with the LLR of the original transmission that is stored in the LLR buffer 433. Those skilled in the art will understand that the combining may take any number of forms. In one example, the combining is a simple adding of the LLR values (e.g., 0.7 in original LLR with a 0.8 in the retransmitted LLR=1.5). In another example statistical methods may be used to combine the LLRs of the multiple packets. The combined LLR data is saved into the LLR buffer 433 and is then sent with the retransmitted packet to the decoder 450 that attempts to decode the retransmitted packet using, at least in part, the combined LLR data from the original transmission and the retransmission. If the retransmitted packet is successfully decoded, the LLR buffer 433 is flushed and the Rx 120 generates and sends the ACK to the Tx 110. If the retransmitted packet is not successfully decoded, no ACK is sent to the Tx 110 and another retransmission of the packet is sent by the Tx 110 and received by the Rx 120. This second retransmission is then processed in the same manner as the first retransmission with the LLR information from the second retransmission being combined with the LLR from the original transmission and first retransmission in the combiner component 437.

It should be noted that the FFT component 410, the demapper component 420, the HARQ processor 430, the controller 440, the decoder 450 and the CRCd checker 460 are shown as separate components. These components may be implemented in the receiving device as separate components or the functionalities of one or more of these components may be implemented in a single device. For example, a processor that executes software code may implement the functionality of the HARQ processor 430, the decoder 450 and the CRCd checker 460.

Figure 5:
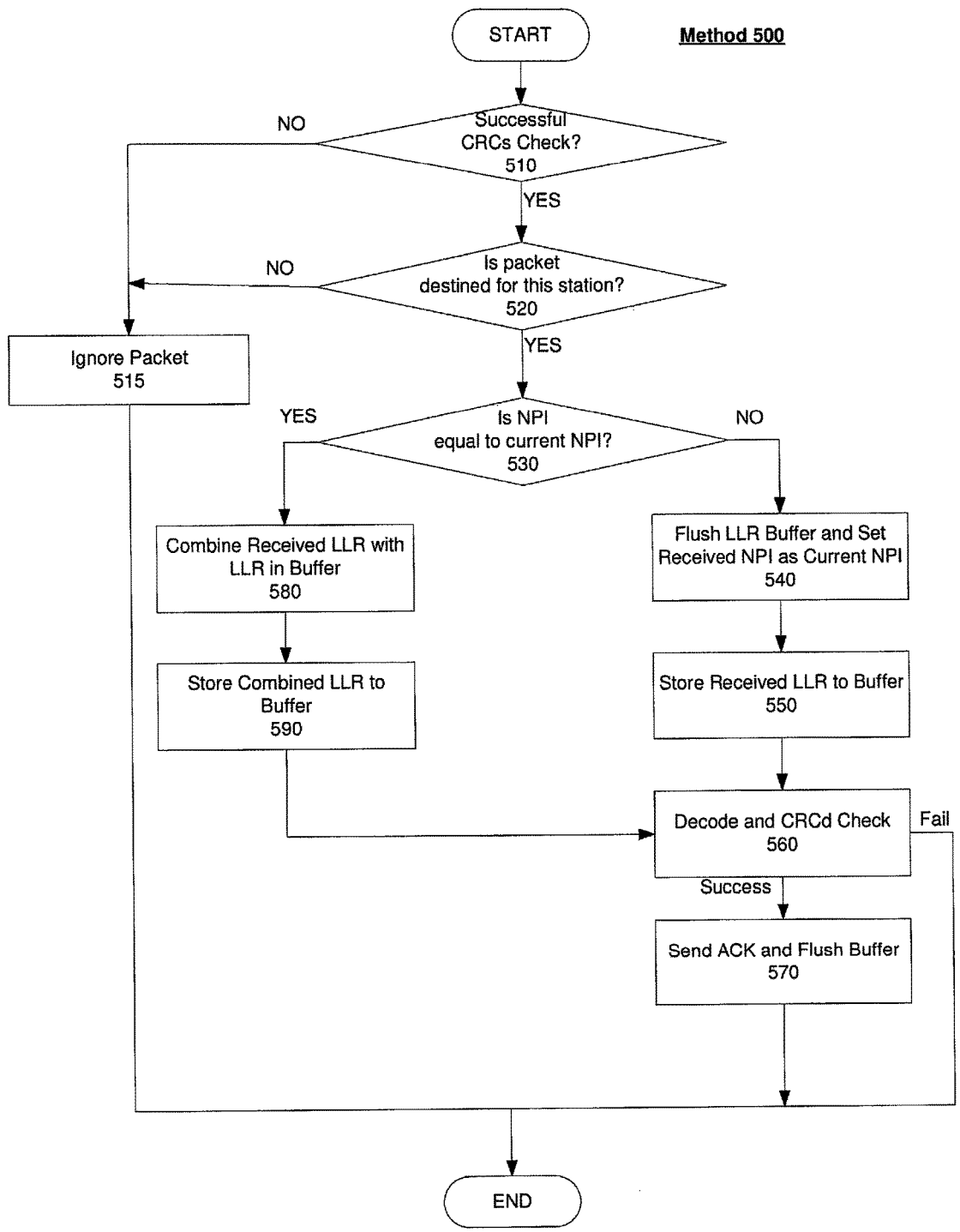
FIG. 5 is an exemplary HARQ processing method implementing an exemplary new packet indicator (NPI) bit.

FIG. 5 shows an exemplary method 500 for performing HARQ processing wherein the packet includes an NPI bit indicating whether the packet is a transmission or retransmission. The method 500 is described with reference to the block diagram of FIG. 4. In step 510, a packet arrives and it is determined whether the CRCs is successful. If the CRCs is not successful, the packet is ignored in step 515 because no useful information may be determined from the packet. If the CRCs is successful, the method 500 continues to step 520 where it is determined if the packet is destined for the device that received the packet (e.g., is the packet destined for Rx 120). If the packet is not destined for the receiving device, the packet may again be ignored in step 515 because there is no reason for the device to decode the packet.

If the packet is destined for the receiving device, the method 500 continues to step 530 where it is determined if the NPI of the packet is equal to the current NPI. As described above, when the NPI is equal to the current NPI, this means that the packet is a retransmission, whereas if the NPI is different from the current NPI, the packet is an original transmission. It will first be considered that the NPI is not equal to the current NPI (e.g., the packet is an original transmission). In this case, the method 500 continues to step 540 where the LLR buffer 433 is flushed and the NPI value of the packet is set to the current NPI. That is, since the packet is an original transmission, the LLR buffer 433 should not include any information except for the LLR information that is extracted from the current packet and the NPI value is set to the current value so it may be determined if the next packet is a retransmission of the current packet or a new packet. It is noted that in the above description of FIG. 4, it was stated that the LLR buffer 433 was flushed after a successful decoding of the packet. This may still be the case, but it may also be that the LLR buffer 433 is flushed when the NPI value is changed.

The method 500 then proceeds to step 550 where the LLR information for the packet is stored in the LLR buffer 433. The method 500 then continues to step 560 where the decoding is attempted (decoder 450) and the CRCd is checked (CRCd component 460). If the CRCd is successful, the method 500 proceeds to step 570 where the Rx 120 flushes the LLR buffer 433 and the Rx 120 sends an ACK to the Tx 110. If the CRCd check is unsuccessful, the method 500 ends, meaning that no ACK is sent to the Tx 110, which then sends a retransmission of the packet.

Returning to step 530, it is now considered that the NPI from the packet is equal to the current NPI meaning that the packet is a retransmission. In this case, the method 500 proceeds to step 580 where the LLR information for the retransmission and the original transmission (and any previous retransmissions of the original transmission) are combined in the combiner component 437. The combined LLR information is then stored to the LLR buffer 433 in step 590 and the method 500 then continues to the decoding step 560 as described above to attempt to decode the retransmission using the combined LLR information.

Figure 6:
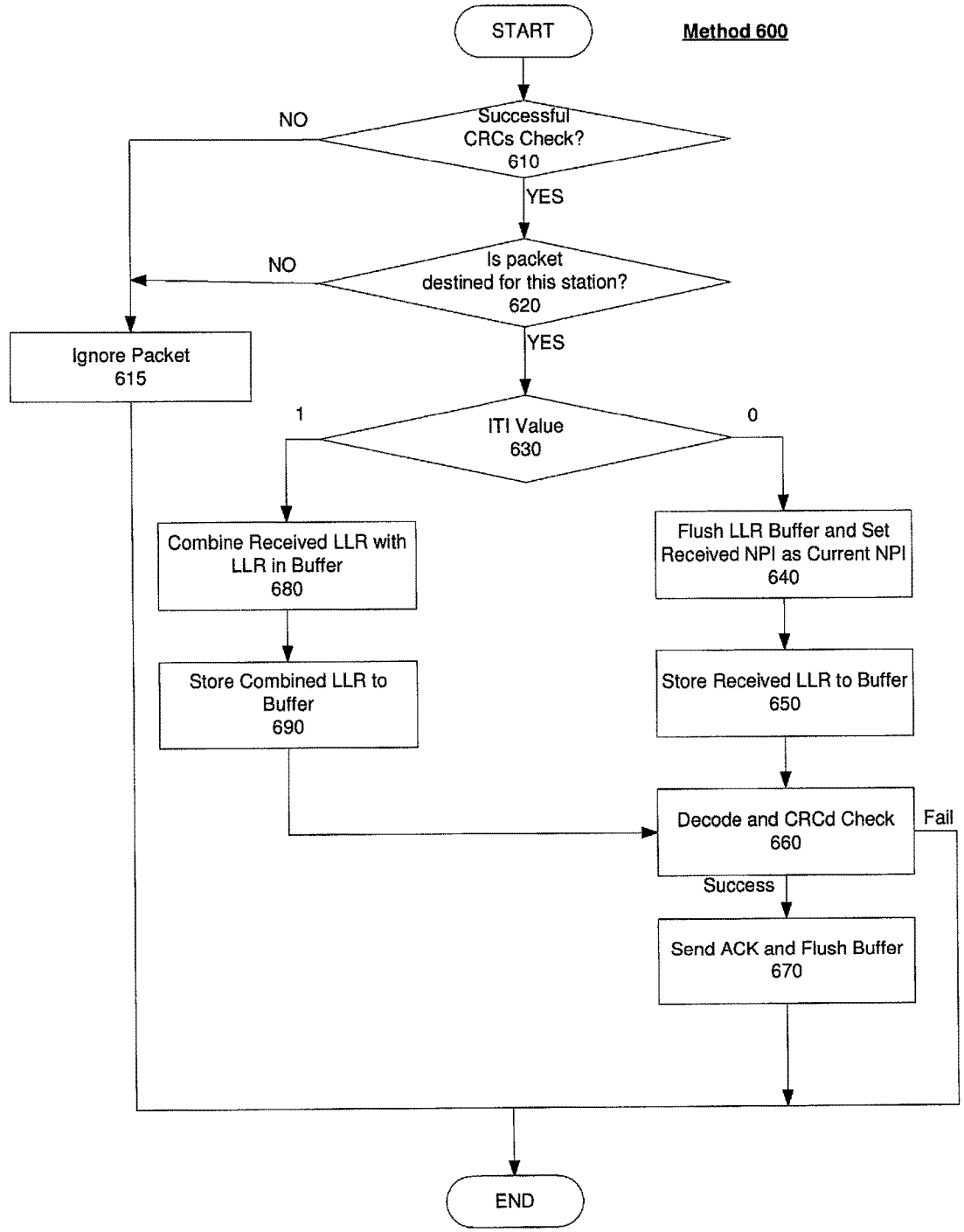
FIG. 6 is an exemplary HARQ processing method implementing an exemplary initial transmission indicator (ITI) bit.

FIG. 6 shows an exemplary method 600 for performing HARQ processing wherein the packet includes an ITI bit indicating whether the packet is a transmission or retransmission. The method 600 is described with reference to the block diagram of FIG. 4. In step 610, a packet arrives and it is determined whether the CRCs is successful. If the CRCs is not successful, the packet is ignored in step 615 because no useful information may be determined from the packet. If the CRCs is successful, the method 600 continues to step 620 where it is determined if the packet is destined for the device that received the packet (e.g., is the packet destined for Rx 120). If the packet is not destined for the receiving device, the packet may again be ignored in step 615 because there is no reason for the device to decode the packet.

If the packet is destined for the receiving device, the method 600 continues to step 630 where the value of the ITI bit of the packet is determined. As described above, when the ITI bit is equal to 1, this means that the packet is a retransmission, whereas if the ITI bit is equal to 0, the packet is an original transmission. It will first be considered that the ITI is equal to 0 (e.g., the packet is an original transmission). In this case, the method 600 continues to step 640 where the LLR buffer 433 is flushed. That is, since the packet is an original transmission, the LLR buffer 433 should not include any information except for the LLR information that is extracted from the current packet.

The method 600 then proceeds to step 650 where the LLR information for the packet is stored in the LLR buffer 433. The method 600 then continues to step 660 where the decoding is attempted (decoder 450) and the CRCd is checked (CRCd component 460). If the CRCd is successful, the method 600 proceeds to step 670 where the Rx 120 flushes the LLR buffer 433 and the Rx 120 sends an ACK to the Tx 110. If the CRCd check is unsuccessful, the method 600 ends, meaning that no ACK is sent to the Tx 110, which then sends a retransmission of the packet.

Returning to step 630, it is now considered that the ITI bit has a value equal to 1 meaning that the packet is a retransmission. In this case, the method 600 proceeds to step 680 where the LLR information for the retransmission and the original transmission (and any previous retransmissions of the original transmission) are combined in the combiner component 437. The combined LLR information is then stored to the LLR buffer 433 in step 690 and the method 600 then continues to the decoding step 660 as described above to attempt to decode the retransmission using the combined LLR information.

Figure 7:
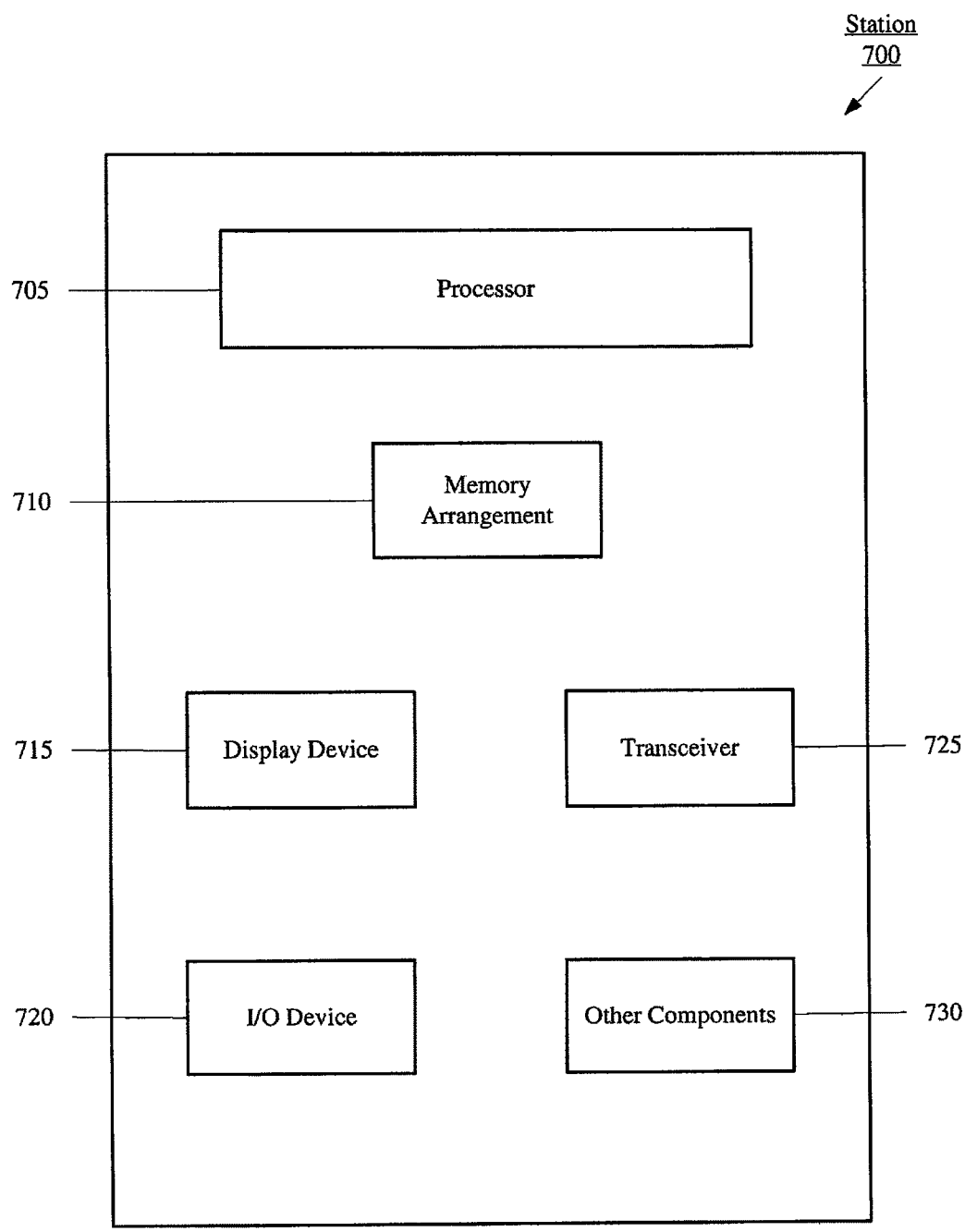
FIG. 7 shows an exemplary station configured to execute in a WLAN.

It is noted that the functionality described herein for the Tx 110 and Rx 120 may be implemented in any device that is capable of operating within a WLAN. FIG. 7 shows an exemplary station 700 configured to execute in a WLAN. The station 700 may represent any electronic device that is configured to perform wireless functionalities. For example, the station 700 may be a portable device such as a mobile phone, a smartphone, a tablet, a phablet, a laptop, etc. In another example, the station 100 may be a stationary device such as a desktop terminal. The station 700 may include a processor 705, a memory arrangement 710, a display device 715, an input/output (I/O) device 720, a transceiver 725, and other components 730. The other components 730 may include, for example, an audio input device, an audio output device, a battery, a data acquisition device, ports to electrically connect the station 700 to other electronic devices, etc.

The processor 705 may be a hardware component configured to execute instructions of a program to perform operations. The operations may include some or all of the exemplary functionalities described above, including the steps of FIGS. 5 and 6. In other embodiments, separate hardware components such as ASICs (that may or may not execute firmware) are included in the station 700 that are used to perform some or all of the steps of FIGS. 5 and 6. The memory arrangement 710 may perform the functionality of the LLR buffer 433. The transceiver 725 may be a hardware component configured to transmit and/or receive data to allow the station 700 to operate as the Tx 110 or Rx 120. That is, the transceiver 725 may enable communication with other electronic devices connected tot eh WLAN network directly or indirectly through a network based upon an operating frequency of the network.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a receiving device:
      receiving a packet, the packet including a signal portion and a data portion, wherein the signal portion comprises an indicating bit that is set to a first value;
      verifying the signal portion of the packet is valid, wherein the verifying the signal portion includes performing a cyclic redundancy check (CRC) on only the signal portion;
      determining if the packet is destined for the receiving device;
      determining whether the packet is a retransmission or an original transmission, wherein the packet is determined to be a retransmission when the first value is equal to a stored second value of a corresponding bit in a previously received packet and wherein the packet is determined to be an original transmission when the first value is different than the stored second value of the corresponding bit in the previously received packet;

combining, when the packet is a retransmission, information from the data portion of the packet with stored information from the previously received packet having a data portion that was not successfully decoded to generate combined information; and
attempting to decode the packet, when the packet is a retransmission, using the combined information.

2. The method of claim 1, wherein the determining if the packet is destined for the receiving device includes:
determining whether device identification data in the signal portion matches an identifier for the device.

3. The method of claim 2, wherein the device identification data includes one of a MAC address of the receiving device, a Partial Associated Identifier of the receiving device or a proxy for the MAC address of the receiving device.

4. The method of claim 1, wherein the determining if the packet is a retransmission is based on data included in the signal portion of the packet, wherein the data includes a bit that is set to a predetermined value to indicate the packet is a retransmission.

5. The method of claim 1, wherein the information and the stored information comprises Log-Likelihood Ratio (LLR) information.

6. The method of claim 1, wherein the stored information is from a plurality of previously received packets.

7. The method of claim 1, further comprising:
generating an acknowledgement when the packet is successfully decoded.

8. The method of claim 1, wherein the packet is received via a wireless local area network (WLAN).

9. A device, comprising:
a receiver that receives a packet via a wireless local area network (WLAN), the packet including a signal portion and a data portion, wherein the signal portion comprises an indicating bit that is set to a first value;
a signal portion decoder that decodes the signal portion of the packet and determines if the packet is destined for the device, wherein the verifying the signal portion includes performing a cyclic redundancy check (CRC) on only the signal portion;
a controller that determines whether the packet is an original transmission or a retransmission, wherein the packet is determined to be a retransmission when the first value is equal to a stored second value of a corresponding bit in a previously received packet and wherein the packet is determined to be an original transmission when the first value is different than the stored second value of the corresponding bit in the previously received packet;
a HARQ processor that extracts information from the data portion of the packet and,
when the packet is an original transmission, stores the information in a buffer, and
when the packet is a retransmission, combines the information with stored information from a previously received packet having a data portion that was not successfully decoded and stores the combined information in the buffer; and
a data portion decoder that decodes the data portion of the packet based at least in part on the information or combined information stored in the buffer.

10. The device of claim 9, wherein the signal portion decoder determines whether device identification data in the signal portion matches an identifier for the device.

11. The device of claim 10, wherein the device identification data includes one of a MAC address of the device, a Partial Associated Identifier of the device or a proxy for the MAC address of the device.

12. The device of claim 9, wherein the controller determines if the packet is a retransmission based on data included in the signal portion of the packet, wherein the data includes a bit that is set to a predetermined value to indicate the packet is a retransmission.

13. The device of claim 9, wherein the information and the stored information comprises Log-Likelihood Ratio (LLR) information.

14. The device of claim 9, wherein the stored information is from a plurality of previously received packets.

15. A device, comprising:
a receiver that receives a packet via a wireless local area network (WLAN), the packet including a signal portion and a data portion, wherein the signal portion comprises an indicating bit that is set to a first value;
a processor configured to execute a set of instructions, the executing of the instructions causing the processor to:
verify the signal portion of the packet is valid, wherein the verifying the signal portion includes performing a cyclic redundancy check (CRC) on only the signal portion;
determine that the packet is destined for the device;
determine whether the packet is a retransmission or an original transmission, wherein the packet is determined to be a retransmission when the first value is equal to a stored second value of a corresponding bit in a previously received packet and wherein the packet is determined to be an original transmission when the first value is different than the stored second value of the corresponding bit in the previously received packet;
combine, when the packet is a retransmission, information from the data portion of the packet with stored information from the previously received packet having a data portion that was not successfully decoded to generate combined information; and
attempt to decode the packet, when the packet is a retransmission, using the combined information.

16. The method of claim 1, further comprising:
discarding the packet when the signal portion is not valid.

17. The method of claim 1, further comprising, when the packet is an original transmission, discarding the stored second value and storing the first value.

18. The method of claim 1, further comprising, when the packet is an original transmission, discarding the stored information from the previously received packet.

19. The method of claim 5, wherein the combined information is generated by adding the LLR information from the data portion of the packet and the stored LLR information from the previously received packet or by employing statistical methods using the LLR information from the data portion of the packet and the stored LLR information from the previously received packet.

20. The method of claim 13, wherein the combined information is generated by adding the LLR information from the data portion of the packet and the stored LLR information from the previously received packet or by employing statistical methods using the LLR information from the data portion of the packet and the stored LLR information from the previously received packet.

* * * * *